United States Patent
Goenka et al.

(10) Patent No.: US 11,694,278 B2
(45) Date of Patent: Jul. 4, 2023

(54) AUTOMATIC ANALYSIS OF DIGITAL MESSAGING CONTENT METHOD AND APPARATUS

(71) Applicant: YAHOO ASSETS LLC, Dulles, VA (US)

(72) Inventors: Mohit Goenka, Santa Clara, CA (US); Nikita Varma, Milpitas, CA (US); Ashish Khushal Dharamshi, Sunnyvale, CA (US)

(73) Assignee: YAHOO ASSETS LLC, New York, NY (US)

( * ) Notice: Subject to any disclaimer, the term of this patent is extended or adjusted under 35 U.S.C. 154(b) by 79 days.

(21) Appl. No.: 16/158,564

(22) Filed: Oct. 12, 2018

(65) Prior Publication Data

US 2020/0117759 A1 Apr. 16, 2020

(51) Int. Cl.

| | |
|---|---|
| *G06N 20/00* | (2019.01) |
| *G06Q 50/00* | (2012.01) |
| *H04L 51/046* | (2022.01) |
| *H04L 67/306* | (2022.01) |
| *G06F 16/9535* | (2019.01) |
| *H04L 51/52* | (2022.01) |
| *H04L 67/50* | (2022.01) |
| *G06F 18/21* | (2023.01) |

(52) U.S. Cl.
CPC ......... *G06Q 50/01* (2013.01); *G06F 16/9535* (2019.01); *G06F 18/2178* (2023.01); *G06N 20/00* (2019.01); *H04L 51/046* (2013.01); *H04L 51/52* (2022.05); *H04L 67/306* (2013.01); *H04L 67/535* (2022.05)

(58) Field of Classification Search
CPC ....... H04L 51/32; H04L 67/22; H04L 51/046; H04L 67/306; H04L 12/58; H04L 29/08; H04L 12/1818; H04L 51/52; H04L 67/535; H04L 67/55; H04L 69/22; G06Q 50/01; G06Q 50/00; G06K 9/6263; G06K 9/62; G06F 16/9535; G06F 17/30; G06F 15/18; G06F 16/9536; G06F 18/2178; G06N 20/00
USPC ....................................... 707/734
See application file for complete search history.

(56) References Cited

U.S. PATENT DOCUMENTS

| | | | |
|---|---|---|---|
| 2011/0231407 A1* | 9/2011 | Gupta ................. | H04M 1/2746 707/748 |
| 2012/0142429 A1* | 6/2012 | Muller .................... | A63F 13/35 463/42 |
| 2013/0117688 A1* | 5/2013 | Yerli ...................... | G06Q 50/01 715/751 |

(Continued)

*Primary Examiner* — Hicham Skhoun
(74) *Attorney, Agent, or Firm* — James J. DeCarlo; Greenberg Traurig, LLP

(57) ABSTRACT

Disclosed are systems and methods for improving interactions with and between computers searching, hosting and/or providing systems supported by or configured with personal computing devices, servers and/or platforms. The methods and systems analyze digital message content in digital communication systems to automatically identify shared user interest(s), to automatically create computerized relationship matrix data identifying user connections, or relationships, using identified shared user interest(s), and to automatically provide a recommendation using the shared user interest and user relationships formed using the shared user interest.

18 Claims, 7 Drawing Sheets

(56) References Cited

U.S. PATENT DOCUMENTS

| | | | |
|---|---|---|---|
| 2013/0159883 A1* | 6/2013 | Yerli | G06Q 30/0277 |
| | | | 715/753 |
| 2014/0122595 A1* | 5/2014 | Murdoch | C03C 21/002 |
| | | | 709/204 |
| 2014/0214895 A1* | 7/2014 | Higgins | G06F 16/9535 |
| | | | 707/770 |
| 2014/0278601 A1* | 9/2014 | Brunn | G06Q 50/14 |
| | | | 705/5 |
| 2014/0289261 A1* | 9/2014 | Shivakumar | G06Q 50/01 |
| | | | 707/748 |
| 2015/0080027 A1* | 3/2015 | Amrhein | H04W 4/12 |
| | | | 455/456.3 |
| 2015/0261844 A1* | 9/2015 | Ramalho | H04W 4/023 |
| | | | 707/749 |
| 2016/0255163 A1* | 9/2016 | Stathacopoulos | H04L 51/14 |
| | | | 709/224 |
| 2018/0124129 A1* | 5/2018 | Geisler | H04L 67/306 |
| 2018/0157981 A1* | 6/2018 | Albertson | G06N 3/006 |
| 2018/0351756 A1* | 12/2018 | Dave | H04N 7/15 |
| 2019/0007228 A1* | 1/2019 | Vuskovic | G06F 16/00 |
| 2019/0073676 A1* | 3/2019 | Wang | G06Q 50/01 |

* cited by examiner

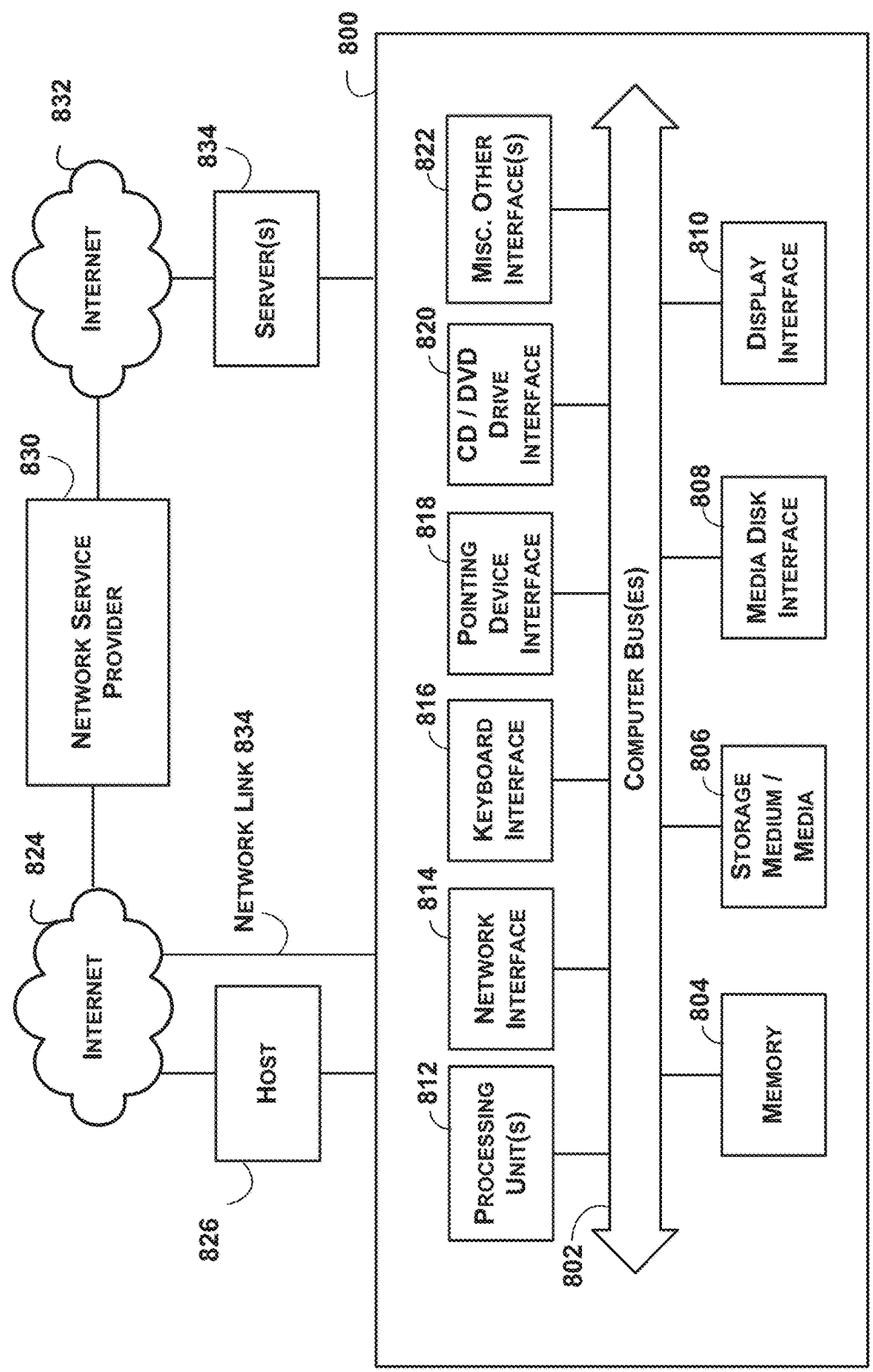

AUTOMATIC ANALYSIS OF DIGITAL MESSAGING CONTENT METHOD AND APPARATUS

FIELD OF THE DISCLOSURE

The present disclosure relates to the analysis of digital message content in digital communication systems for adding functionality to message servers or networked systems via the creation of relationship matrix data.

BACKGROUND

Currently, computerized social networking systems maintain identified interconnections between users of an online, digital social network using a data construct generally referred to as a computerized social network graph. The computerized social network graph identifying entities and relationships is typically depicted or rendered as a tree-like graph structure comprising nodes and edges—with entities, e.g., persons, or other users of the social networking system, being represented as nodes and each established relationship between two entities being represented as a line, or edge, between the two nodes corresponding to the two entities. A relationship between two entities is established once one entity receives and accepts a request, e.g., a friend request, from another user. In some cases, a social networking system can use one or more existing connections to make a recommendation, to a first entity, of one or more entities that may be of interest to the first entity; and, the relationship is established once both entities agree with the recommendation. For example, assume a scenario in which a first entity, entity A, has an existing direct connection (or relationship) in the social network graph to entity B and entity B has an existing direct relationship (in the social network graph) with entity C. In such a scenario, since entities A and C both have an established relationship with entity B, the social networking system might assume that that entity A may wish to establish a direct relationship with entity C and make such a recommendation. While this approach is effective in using an existing social network graph with existing relationships to establish new relationships between entities, this approach is limiting in that it is limited to the information contained in the social network graph. That is, the conventional technology, such as that provided by a social networking system, or service, is limited to the information contained in the social network.

SUMMARY

The present disclosure provides novel systems and methods for automatic shared user interest identification, using digital messages and related data, automatic creation of computerized relationship matrix (of user relationships), using identified user interest(s), and automatic provision of a recommendation using the shared user interest and user relationship formed using the shared user interest. Use of digital messaging and related data in the manner described herein to identify shared user interest and to create user relationships based on the shared user interest provides a novel approach (over and above conventional approaches which use express friend requests and recommendations based on existing relationships) for identifying user relationships, which when applied improve the functionality of various computerized technologies, including without limitation, computerized social networking systems, digital messaging systems, online fantasy sports systems, etc.

Examples of social networking services include without limitation, Facebook®, Twitter®, Flickr®, LinkedIn®, Myspace®, Tumblr®, Yelp®, etc. Presently, a social networking service provides technology for each of its online users to specify a relationship (e.g., a friend relationship) with a number of other online users of the service. The social networking service may use its own social networking graph of user-specified relationships to make recommendations of new relationships that the user can either accept or decline. While a social networking service provides technology for building its own social network graph, which provides a mapping of its internet users and how its users are interrelated (via user-specified relationships) on its own platform, the social networking service is unaware of relationships established using another social networking service or other service, including services in which users communicate via digital messaging. In addition to being unaware of relationships known by other social networking service, each social networking service's technology for identifying potential relationships is limited to its own data, i.e., its social networking graph. This problem in the art is solved by the subject matter described and claimed herein.

A digital message can be any type of electronic communication, such as and without limitation an electronic mail (or email) message, short message service (SMS) message, multimedia media service (SMS) message, blog or other posting, voicemail, etc. Examples of digital message service providers include without limitation Yahoo!® Mail, Yahoo! Messenger®, Twitter®, Yahoo! Together, etc. In addition, various social networking services provide various digital messaging services. A digital messaging service may provide a search tool that allows a user to search for and locate messages that meet the user's specified search criteria. However, such a search tool is limited to finding messages that satisfy the specified search criteria. The user is relegated to entering search terms and then clicking on each message in a set of search results in order to locate the desired message. In many cases, the user must perform a number of searches in order to locate the desired message(s).

The automatic identification of a shared user interest described herein enables rapid and automatic identification of user interconnections, or relationship, through analysis of digital message content and related data, which identified interconnections can be used to drive user engagement through recommendations, such as recommendations for user groups (such as and without limitation activity-based groups and messaging groups). This presents improvements to the comprehensiveness of any data structure maintaining user relationships, including a social network graph. In addition, the automatic creation of user relationships can provide user efficiencies by eliminating the need to perform digital messaging searches in an effort to locate interested persons and/or to send blast messages in search of interested persons. In addition, elimination of messages requesting a response in order to find interested persons results in a reduction of network traffic, e.g., the elimination of digital messages sent to disinterested recipients.

According to some embodiments, the disclosed systems and methods first identify a persona for each of a number of users. A user's persona comprises a characterization of the user's interests (which may be represented as an interest matrix) identified using digital messaging content of the user. The user's digital messages are analyzed to determine interests of the user and to generate the interest matrix for the user. For example, the user's persona can comprise an interest matrix, which can comprise a hierarchy of interests identified for the user using the user's digital message content. By way of a further non-limiting example, a sports node of a hierarchical interest matrix can act as a parent node for soccer and football child nodes, all of which can be included in the user's interest matrix based on an analysis of the user's digital message content.

The disclosed systems and methods then identify a number of top contacts of the user using a determined communication frequency, or frequency of interaction, among the user and the user's contacts, using the user's digital messages. The number of top contacts comprises those contacts, of the user, having a corresponding interaction frequency greater than the frequency of interaction determined for each unselected contact. The top contacts can be determined by first determining a frequency of interaction (e.g., a number of messages sent by the user identifying the contact, number of messages received by the user and identifying the contact, number of messages opened, or read, by the user and identifying the contact, and/or number of messages responded to, by the user, and identifying the contact) for each contact, and then using the frequency of interaction determined for each contact to select a number of contacts having the greater, or higher, frequency of interaction relative to other unselected contacts (e.g., the unselected contacts having a corresponding frequency of interaction that is less than the frequency of interaction corresponding to each selected contact).

The disclosed systems and methods then use the user's persona in a comparison with each persona of a top contact to identify one or more common interests shared by the user and a number of the top contacts identified for the user. The disclosed systems and methods can then update a relationship matrix (e.g., a social network graph) to indicate that the user and those top contacts sharing a common interest have a relationship based on their shared interest(s). For example, the relationship matrix can be updated such that an edge (or connection) exists between each pair of users, including the user and the user's top contacts, determined to share a common interest. In addition, each interconnection can indicate the shared interest. In other words, the relationship matrix can indicate both the connection, or relationship, between the users and the shared interest(s) that relates the users.

The disclosed systems and methods can then use the relationship matrix to make a recommendation to the user. For example and assuming that the shared interest is cricket, the recommendation can comprise a recommendation (e.g., an invitation sent to the user and the user's top contacts) to form a user group to discuss cricket. As yet another non-limiting example, assuming that the user and the user's top contacts have an interest in sports (e.g., professional soccer), the recommendation can comprise an invitation join an online fantasy sports league of an online fantasy sports service. By way of another non-limiting example, assuming that the user and the user's top contacts are interested in travel, the recommendation can be to form a group to discuss traveling to a specific location (e.g., New York City), or traveling in general.

It will be recognized from the disclosure herein that embodiments of the instant disclosure provide improvements to a number of computing technology areas, for example those related to processes and systems (or services) such as electronic social networking systems (which manage social network graphs and recommend social network relationships), digital messaging systems, recommendation systems, etc. that handle or manage the searching and sharing of information and/or provide communication tools (e.g., short messaging services, electronic messaging services, blogging, content sharing, searching, etc.) to online users using various devices including set-top boxes, smart phones, laptop computing devices, personal digital assistants, tablets, desktop computing devices, etc.

Embodiments of the instant disclosure provide an improved mechanism for using digital message content for identifying a shared interest, augmenting a relationship matrix to reflect the shared interest, recommending user relationships and making recommendations using identified shared interest(s). In addition, embodiments of the instant disclosure provide an automated searching mechanism, thereby reducing the need for manual searching, to identify top contacts sharing at least one interest with the user. In addition, the automated searching mechanism provided by embodiments of the instant disclosure result in a reduction in unwanted network traffic (e.g., blast electronic mail communications) as communication can be directed to identified, interested users.

The disclosed systems and methods can effectuate increased speed and efficiency in the ways in which users can access and use digital messaging information, thereby minimizing user effort, as the disclosed systems and methods, inter alia, automatically search the digital messaging information and analyze the information contained in a user's digital messages to identify shared interests between the user and other users (or contacts) of the user. Users are provided with a fully automated search and recommendation experience that improves efficiency of the user by eliminating the need for the user to search for users and/or blasting communication to many disinterested users. The user's digital messages are automatically searched and analyzed, and the user is provided with a recommendation identifying users having a shared interest.

In accordance with one or more embodiments, a method is disclosed which includes obtaining, at a computing device, a plurality of digital messages of a user; determining, via the computing device and using the plurality of digital messages, a persona of the user, the user's persona identifying a number of interests of the user identified using the plurality of digital messages; determining, via the computing device and using the plurality of digital messages, a plurality of contacts of the user, for each contact of the number, the determining comprising determining an interaction frequency using the plurality of digital messages; selecting, via the computing device and using the interaction frequency determined for each of the plurality of contacts, a number of contacts from the plurality of contacts, each selected contact, of the number, having a higher interaction frequency than unselected contacts of the plurality of contacts; determining, via the computing device, an interest shared by the user and at least one selected contact of the number of selected contacts, the determining comprising comparing the persona of the user with the persona of each selected contact of the number, the shared contact being identified in the persona of the user and the at least one selected contact; automatically maintaining, via the computing device, a relationship data structure to include information indicating a relationship between the user and the at least one selected contact, the relationship identifying the shared interest between the user and the at least one selected contact; and automatically making, via the computing device and using the relationship data structure, a recommendation directed to at least one of the user and the at least one contact, the recommendation identifying the shared interest and recommending at least one activity in accordance with the shared interest.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for automatically identifying shared user relationships, maintaining a relationship matrix of the shared user relationships and making recommendations using the shared user interests and corresponding relationships.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DRAWINGS

The above-mentioned features and objects of the present disclosure will become more apparent with reference to the following description taken in conjunction with the accompanying drawings wherein like reference numerals denote like elements and in which:

FIG. 8 is a block diagram illustrating the architecture of an exemplary hardware device in accordance with one or more embodiments of the present disclosure.

DETAILED DESCRIPTION

Figure 1:
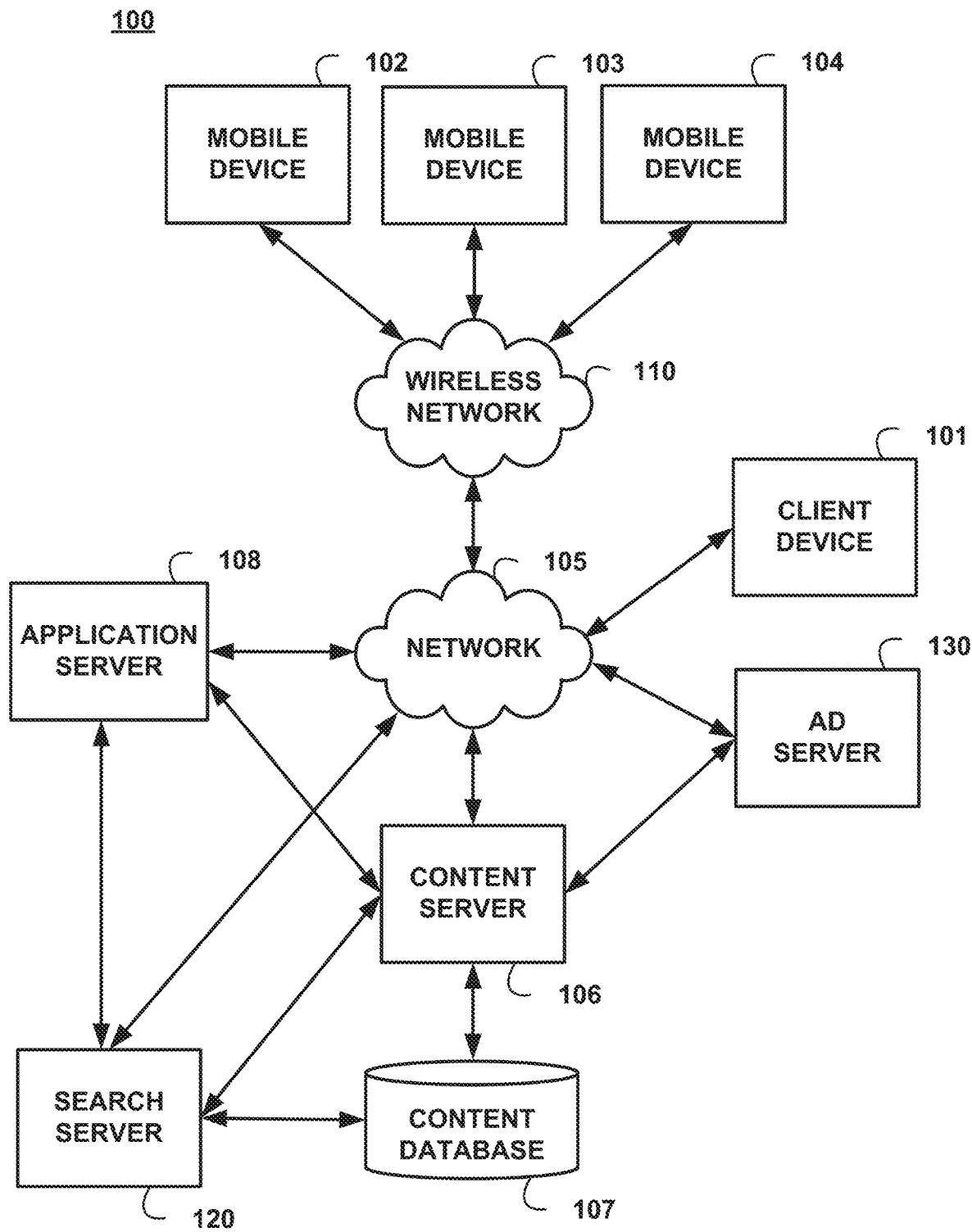
FIG. 1 is a schematic diagram illustrating an example of a network within which the systems and methods disclosed herein could be implemented according to some embodiments of the present disclosure.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via electronic mail (or email), for example Yahoo! ® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing or displaying various forms of content, including locally stored or streamed video, or games (such as fantasy sports leagues). The foregoing is provided to illustrate that claimed subject matter is intended to include a wide range of possible features or capabilities.

The detailed description provided herein is not intended as an extensive or detailed discussion of known concepts, and as such, details that are known generally to those of ordinary skill in the relevant art may have been omitted or may be handled in summary fashion.

The principles described herein may be embodied in many different forms. By way of background, digital messages comprise data for transmission, via an electronic communications network, by one user to a number of other users and/or data that is received by one or more users from another user. A digital message (which is also referred to herein as an electronic message) can comprise various types of content, such as and without limitation text, video, audio, multimedia, etc. Examples of digital messages include without limitation an instant message, text message, SMS message, MMS message, email message, voicemail message, etc. A digital message typically comprises a header (or other) portion identifying the sender and the recipient(s) of the message. In addition, a digital message comprises a body containing the contents of the user's message. A digital message can include other parts, such as and without limitation a subject, an attachment, a hyperlink (to a destination, or location, such as an online site, document or other resource, a local or remote network site, document or other resource), etc. A user (a sender or a recipient) is uniquely identified by a name that is typically found in the header of the digital message. For example, a header of an email message typically includes from and to designations for each user using a username and domain name combination, such as: username@domain.com. A messaging service can be provided as a standalone service (such as and without limitation Yahoo! ®Mail), or in combination with another service, such as a social networking service (e.g., Facebook®). Each messaging service typically provides a website portal and/or a messaging application by which a user can send new (or reply to received) messages, open/read received messages and search existing (sent, received, saved, etc.) messages.

While a messaging service typically includes a search tool for use by the user in locating those messages that meet the user's specified search criteria, the search tool is quite rudimentary in its functionality. More particularly, the search tool typically allows the user to specify the search terms and to limit the search to certain components of a message. However, such a search tool is limited to finding messages that satisfy the specified search criteria. The user is relegated to entering search terms and then clicking on each message in a set of search results in order to locate the desired message. In many cases, the user must perform a number of searches in order to locate the desired message(s). The search capability is rudimentary and lacks any ability to automatically identify shared interests between users.

In addition, conventional social networking technology lacks an ability to automatically connect users based on a shared interest, and further lacks an ability to analyze digital messaging content to identify a user's interest(s), to identify the user interest(s) shared with one or more other users, to generate (or augment) a social network graph with user connections (or relationships) based on shared interests determined using digital messaging content, to associate a connection (or relationship) with the shared interest connecting the users and/or to provide a recommendation to one or more of the users identified as having a shared interest through an analysis of digital messaging content.

The instant disclosure provides a novel solution addressing the immediate demand for an automated system, application and/or platform that uses digital messaging content for automatically identifying a shared interest between users, for identifying user connections (or relationships) based on the shared interest, and for making one or more recommendations based on the shared interest. The present disclosure provides novel systems and methods for automatic identification of shared user interest(s), using digital message content, automatic creation of computerized user network connections, or relationships, using identified user interest(s), and automatic provision of a recommendation using the shared user interest and user relationship formed using the shared user interest.

According to some embodiments, the disclosed systems and methods first identify a persona for each of a number of users. A user's persona comprises a characterization of the user's interests, which may be represented as an interest matrix (or graph or other structure), identified using digital messaging content. The user's digital messages are analyzed to determine interests of the user and to generate the interest matrix for the user. For example, the user's persona can comprise an interest matrix, which can comprise a hierarchy of interests identified for the user using the user's digital message content. By way of a further non-limiting example, a sports node of a hierarchical interest matrix can act as a parent node for soccer and football child nodes, all of which can be included in the user's interest matrix based on an analysis of the user's digital message content.

The disclosed systems and methods then identify a number of top contacts of the user using a determined frequency of interaction (which is also referred to herein as interaction frequency, frequency of communication and communication frequency) of the user and the user's contacts using the user's digital messages. The number of top contacts comprises those contacts having a corresponding interaction frequency greater than the frequency of interaction determined for each unselected contact. The top contacts can be determined by first determining a frequency of interaction (e.g., a number of messages sent by the user identifying the contact, number of messages received by the user and identifying the contact, number of messages opened, or read, by the user and identifying the contact, and/or number of messages responded to, by the user, and identifying the contact) for each contact, and then using the frequency of interaction determined for each contact to select a number of contacts having the greater (or higher) frequency of interaction relative to other unselected contacts (e.g., the unselected contacts having a corresponding frequency of interaction that is less than the frequency of interaction corresponding to each selected contact).

The disclosed systems and methods then use the user's persona in comparison with each persona of a top contact to identify one or more common interests shared by the user and a number of the top contacts identified for the user. The disclosed systems and methods can then update a relationship matrix (e.g., a social network graph) to indicate that the user and those top contacts sharing a common interest have a relationship based on their shared interest(s). For example, the relationship matrix can be updated such that an edge (or connection) exists between each pair of users, including the user and the user's top contacts, determined to share a common interest. In addition, each interconnection can indicate the common interest. In other words, the relationship matrix can include both the connection, or relationship, between the users and the shared interest(s) that relates the users.

The disclosed systems and methods can then use the relationship matrix to make a recommendation to the user. For example and assuming that the shared interest is cricket, the recommendation can comprise a recommendation (e.g., an invitation sent to the user and the user's top contacts) to form a user group to discuss cricket. As yet another non-limiting example, assuming that the user and the user's top contacts have an interest in sports (e.g., professional soccer), the recommendation can comprise an invitation join an online fantasy sports league of an online fantasy sports service. By way of another non-limiting example, assuming that the user and the user's top contacts are interested in travel, the recommendation can be to form a group to discuss traveling to a specific location (e.g., New York City), or traveling in general.

Certain embodiments will now be described in greater detail with reference to the figures. The following describes components of a general architecture used within the disclosed system and methods, the operation of which with respect to the disclosed system and methods being described herein. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108, search server 120 and advertising ("ad") server 130.

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as acquaintances, friends, family, colleagues, or co-workers, which are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refer to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site or service, such as streaming media site/service (e.g., YouTube®), an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a video application and/or video platform, can be provided via the application server 108, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo! ®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a streaming video application (e.g., YouTube®, Netflix®, Hulu®, iTunes®, Amazon Prime®, HBO Go®, and the like), blog, photo storage/sharing application or social networking application (e.g., Flickr®, Tumblr®, and the like), can be hosted by the application server 108 (or content server 106, search server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120 and/or 130.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
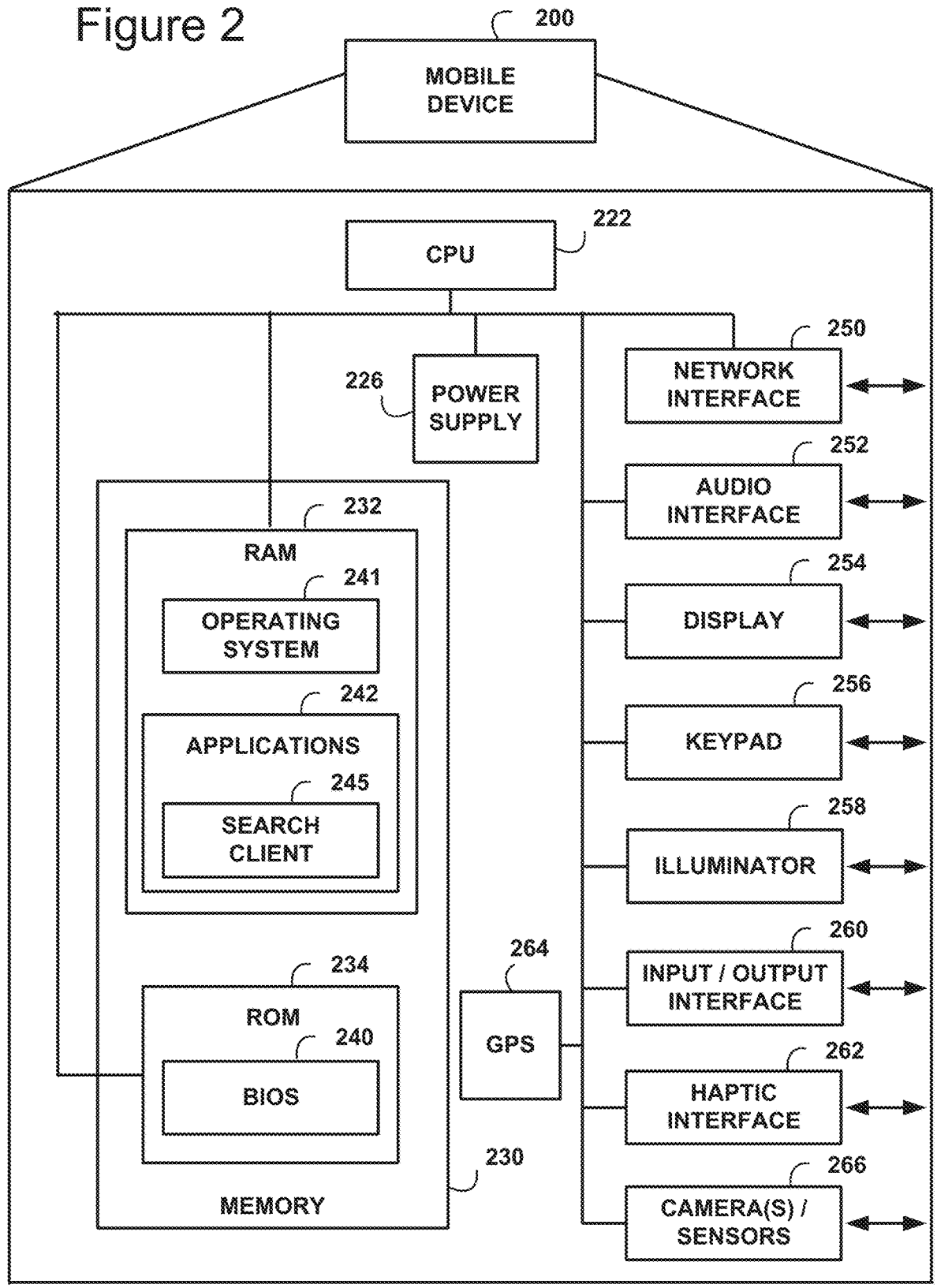
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the client device 200 receives a communication from another user.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, client device 200 may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by client device 200 to store, among other things, applications 242 and/or other data. For example, data stores may be employed to store information that describes various capabilities of client device 200. The information may then be provided to another device based on any of a variety of events, including being sent as part of a header during a communication, sent upon request, or the like. At least a portion of the capability information may also be stored on a disk drive or other storage medium (not shown) within client device 200.

Applications 242 may include computer executable instructions which, when executed by client device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving advertisements, IMs, emails, and other types of known messages, or the like.

Figure 3:
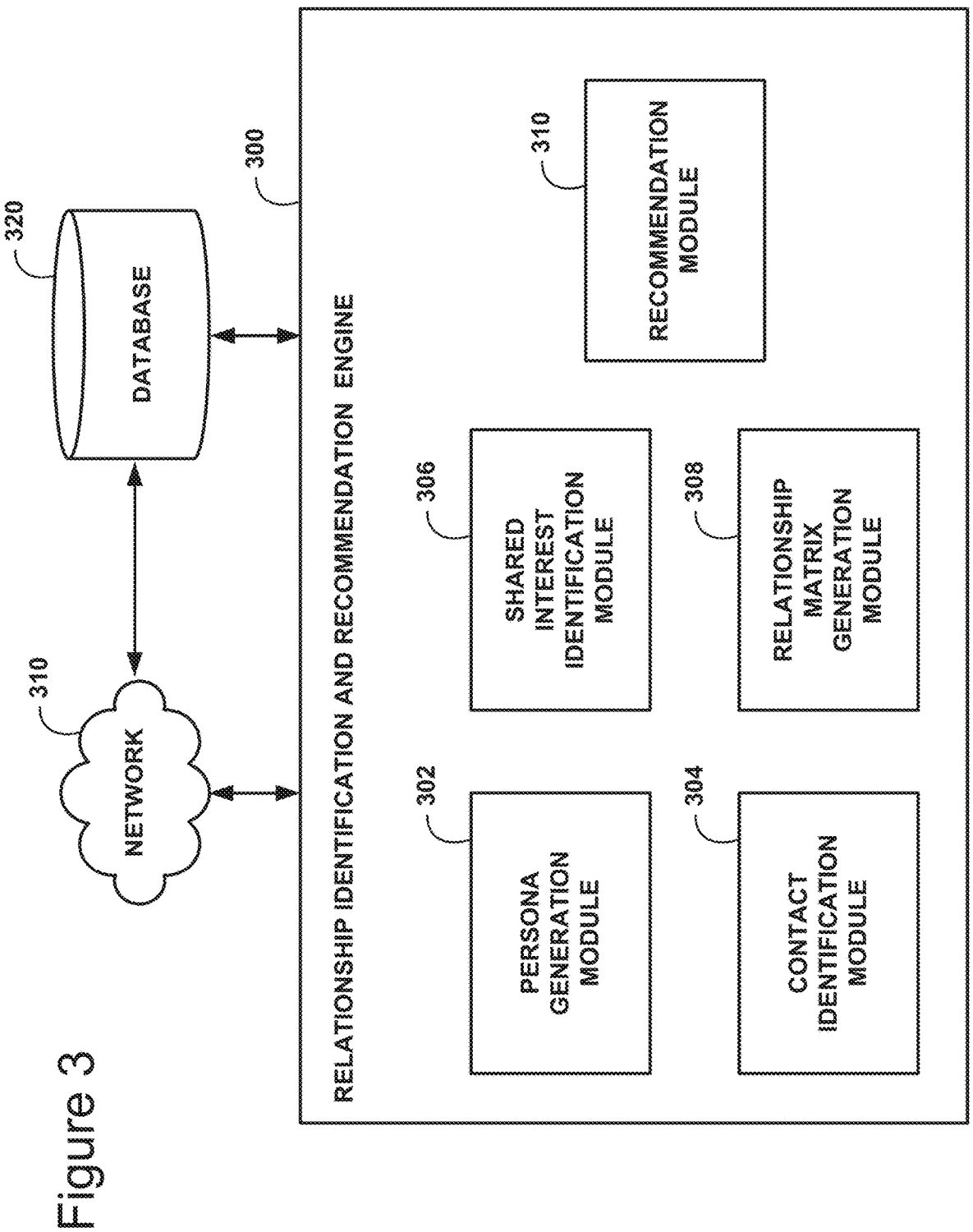
FIG. 3 is a schematic block diagram illustrating components of an exemplary system in accordance with embodiments of the present disclosure.

FIG. 3 is a block diagram illustrating the components for performing the systems and methods discussed herein. FIG. 3 includes a relationship identification and recommendation (RIR) engine 300, network 310 and database 320. The engine 300 can be a special purpose machine or processor and could be hosted by an application server, content server, social networking server, web server, search server, content server, email server, digital messaging server, ad server, user's computing device, and the like, or any combination thereof.

According to some embodiments, engine 300 can be embodied as a stand-alone application that executes on a user device. In some embodiments, the engine 300 can function as an application installed on the user's device, and in some embodiments, such application can be a web-based application accessed by the user device over a network. In some embodiments, the engine 300 can be installed as an augmenting script, program or application to another media application (e.g., Yahoo! ® Mail, Yahoo! ® Messenger, Squirrel®, Facebook®, and the like).

The database 320 can be any type of database or memory and can be associated with a server on a network (such as and without limitation a digital messaging server, social networking server, application server, etc.) or a user's device. Database 320 comprises a dataset of data and metadata associated with local and/or network information related to users, services, applications, content (e.g., video)

and the like. Such information can be stored and indexed in the database 320 independently and/or as a linked or associated dataset. It should be understood that the data (and metadata) in the database 320 can be any type of information and type, whether known or to be known, without departing from the scope of the present disclosure.

According to some embodiments, database 320 can store data for users, e.g., user data. According to some embodiments, the stored user data can include, but is not limited to, digital messages, persona, contacts, shared interests and associated contacts, recommendations, relationship matrix, social networking graph, as well as information associated with a user's profile, user behavioral information, user attributes, user preferences or settings, user demographic information, user location information, user biographic information, and the like, or some combination thereof. In some embodiments, the user data can also include user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can store data and metadata associated with digital message content from an assortment of messaging providers. For example, the database 320 can comprise any digital message, or electronic communication, such as and without limitation an email message, text message, blog post, voicemail message, etc. Each message type can comprise a number of different component parts, such as and without limitation a header, footer, properties, metadata, body, attachment, signature, etc.

The network 310 can be any type of network such as, but not limited to, a wireless network, a local area network (LAN), wide area network (WAN), the Internet, or a combination thereof. The network 310 facilitates connectivity of the engine 300, and the database 320. Indeed, as illustrated in FIG. 3, the engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as engine 300, and includes persona generation module 302, contact identification module 304, shared interest identification module 306, and recommendation module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed with reference to FIG. 4.

As discussed in more detail below, the information processed by the engine 300 can be supplied to the database 320 in order to ensure that the information housed in the database 320 is up-to-date as the disclosed systems and methods leverage real-time information and/or behavior associated with digital messages, user and/or the user's device. For example, the process 400 discussed below in connection with FIG. 4 can be performed intermittently, e.g., as new digital messages are obtained, which can result in new shared interests being identified, new contacts being selected, etc.

Figure 4:
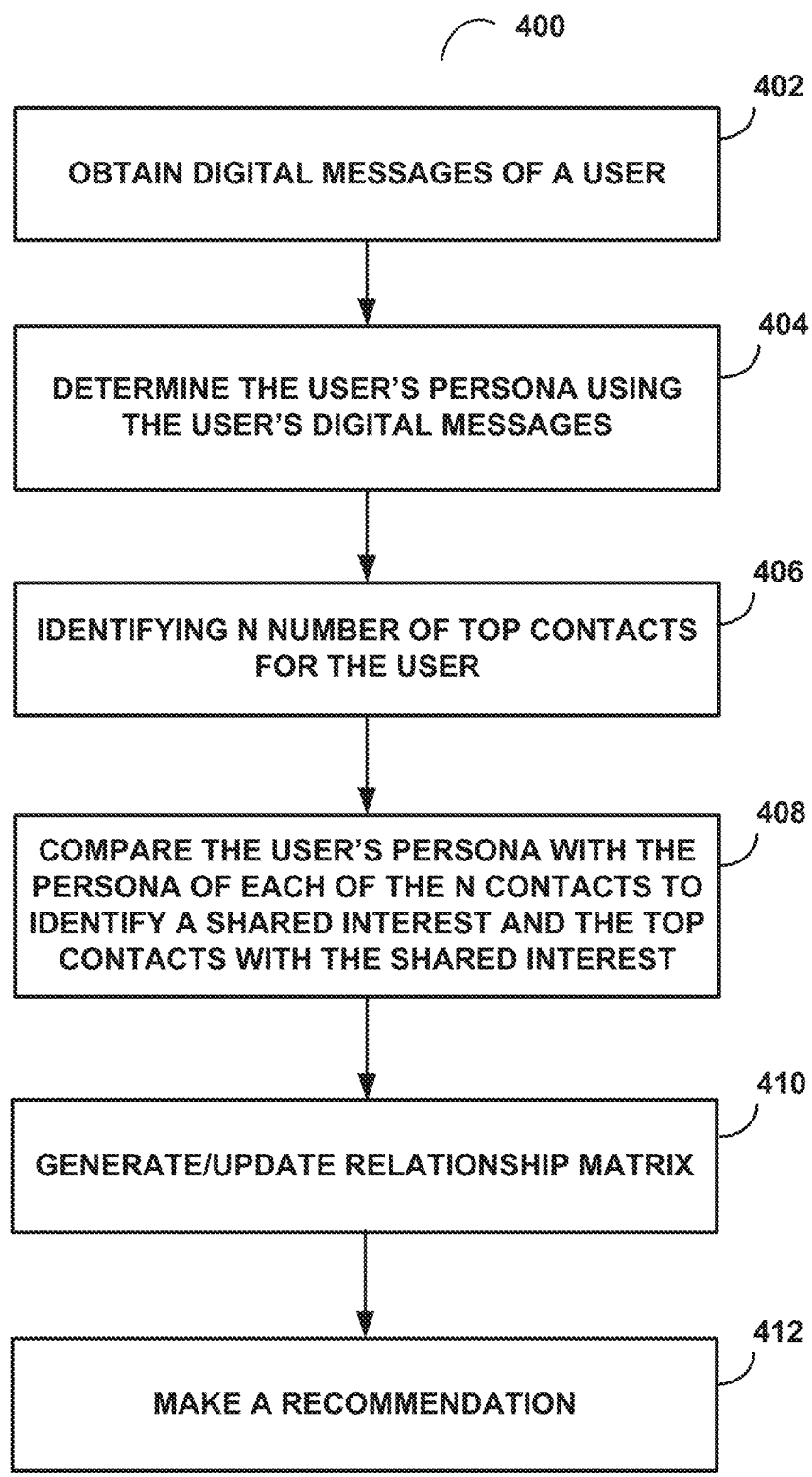
FIG. 4 is a flowchart illustrating steps performed in accordance with some embodiments of the present disclosure.

FIG. 4 provides a process flow overview in accordance with one or more embodiments of the present disclosure. Process 400 of FIG. 4 details steps performed in accordance with exemplary embodiments of the present disclosure for automatically identifying shared user interest(s), using digital message content, automatically creating a computerized relationship matrix using identified user interest(s), and automatically providing a recommendation using the shared user interest and user relationship formed using the shared user interest. The process 400 uses digital message content of digital messages, such as electronic mail, text, twitter, etc. digital messages. The steps shown in process 400 can be performed for any number of digital messaging service users using digital messages obtained from any number of digital messaging services. In some embodiments, the digital messages are obtained from different types of messaging services (e.g., email messaging, text messaging, posting services, etc.) can be used in combination. In some cases, the digital messages are different types of digital messages (e.g., email and text messages) from the same or different messaging service providers.

According to some embodiments, as discussed herein with relation to FIG. 4, the process involves automatically determining a user persona, for each of a number of users, using each user's digital messages. A user persona determined using a user's digital messages comprises information indicating a user's interests. In some embodiments, a classifier, or other machine-trained model, can be trained to take, as input, a user's digital messaging content, and to provide, as output, an indication of the user's interests. Some examples of classification algorithms for machine learning include without limitation linear classifiers (e.g., Logistic Regression, Naïve Bayes Classifier), Support Vector Machines, Decision Trees, Boosted Trees, Neural Networks, etc.

In some embodiments, a user's persona is represented as an interest tree, with each node representing a user interest, with each parent node having a number of child nodes that further refine the parent node's user interest. In some embodiments, a user persona comprises a vector with each position (e.g., bit) in the vector representing a user interest and having a value (e.g., 0 or 1, Y or N, etc.) indicating whether or not the user has the user interest corresponding to the position. As is discussed in more detail below, a number, N, of the user's top contacts (e.g., other users communicating with the user via one or more types of digital messages) are determined for the user. The user persona of each of the top N contacts are compared to the user's persona to identify a shared user interest between the user and some subset of the user's top N contacts (or subset of the number of top contacts determined for the user). Using the determined shared user interest and the contacts identified as having the shared user interest in common, a user relationship matrix is generated, or an existing matrix is updated, to indicate that the user and the contacts are related by their shared interest. The relationship matrix and the determined shared user interest can then be used to make a recommendation, as is discussed further below.

At Step 402, a user's digital messages are obtained. Step 402 can be performed by engine 300, e.g., persona generation module 302. As discussed herein, the digital messages can be from one messaging service or from more than one messaging service; and, in the latter case, from the same or different types of digital messaging services. For example, the user's digital messages can be obtained from the user's computing device (e.g., an email messaging folder, a text messaging store, etc.) and/or the digital messages can be obtained from the digital messaging service(s). The digital messages can include messages sent (to one or more users) by the user, messages received by the user (as the sole recipient or as one of multiple recipients, messages written by the user, messages forwarded by the user, etc. As discussed herein, each component part of a digital messages as well as any external metadata associated with a digital message can be obtained at Step 402. The data obtained at step 402 can be stored in database 320 and used in process 400.

At Step 404, which is performed by persona generation module 302, uses the data obtained at Step 402 to determine a user's persona. A user's persona comprises information indicating each interest determined for the user using the data obtained at Step 402. In accordance with one or more embodiments, a classifier, or other statistical machine learning model, can be used to determine a user's interests using the user's digital messages obtained at Step 402. A classifier, or classifiers, can be generated using a supervised learning approach to learn from training data, e.g., data extracted from digital messages from the user, or users, together with interest labeling. For example, the training data can comprise a number of training instances in the form of digital messaging features (e.g., words, terms, etc. extracted from the digital message(s)) and labeling information indicating the interest(s) associated with each instance of training data.

Once trained, the classifier, or classifiers, can be used to identify a user's interest from data extracted from the digital message data obtained in Step 402. For example, feature data can be extracted from the digital messages obtained at Step 402 and provided as input to the trained classifier(s), with each trained classifier using the feature data input to generate output indicating the user's interests. By way of a further non-limiting example, the output can be a probability (for each interest) that the user has an interest in (or connection with) the interest. In some embodiments, a threshold probability can be used in determining whether the user has at least a desired degree of interest in (or connection with) the interest identified by the classifier. As yet another non-limiting example, the output provided by the trained classifier can be a set identifying each interest of the user identified using the data obtained at Step 402.

The data that is provided to the trained classifier(s) can be extracted from any portion of the digital message as well as any external data, or metadata, associated with the digital message. For example, the domain name, e.g., expedia.com, of the sender of a digital message can be extracted and used, by the classifier(s), to identify the user's interest in travel. By way of some further non-limiting examples of domain names and some interests that may be attributed to the user are: hotels.com and united.com can indicate an interest in travel, and opentable.com can indicate a user's interest in dining out in general and more specifically to cuisines and/or restaurants. Other parts of a message, such as a message body, may include the terms that can be used in determining a user's interest(s). By way of a non-limiting example, and using the example of the united.com sender domain, the message body can include an itinerary indicating a destination, e.g., New York City, indicating a user's interest in travel and more specifically travel to New York City. By way of a further non-limiting example, the name, and/or contents, of an attachment can provide information that can be used by the classifier(s) in determining the user's interest(s).

Figure 5:
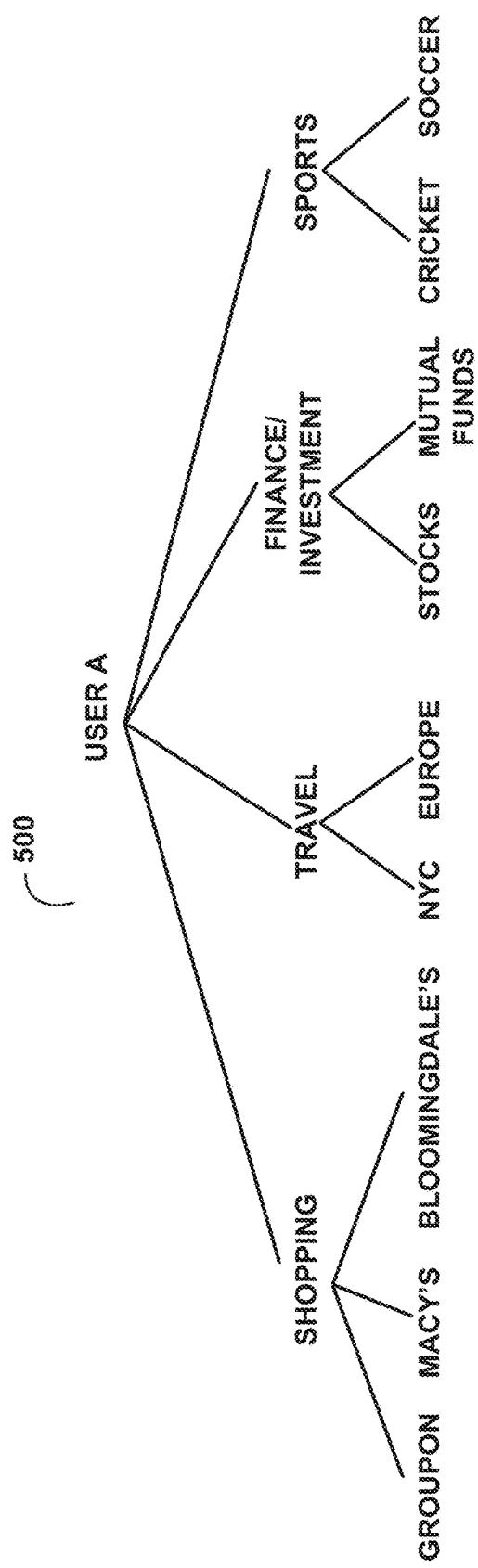
FIG. 5 is a diagram of an exemplary example of a non-limiting embodiment in accordance with some embodiments of the present disclosure.

FIG. 5 provides an exemplary illustration of a non-limiting embodiment in accordance with some embodiments of the present disclosure. Reference 500 is an exemplary illustration depicting at least a portion of a user's persona determined using the output of a trained model, e.g., the trained classifier(s) generated using features of the data obtained at Step 402. As illustrated by the example of FIG. 5, in some embodiments, user interests can be expressed hierarchically, with each child node providing a more refined expression of an interest associated with the parent node. For example and with respect to user A, the user's interest in shopping includes an interest in the Groupon® site, as well as an interest in specific department stores. User A has an interest in travel, as well as specific interests in travel to New York City and to Europe. In the example, User A has an interest in finance/investment, stocks, mutual funds, sports, cricket and soccer.

Figure 6:
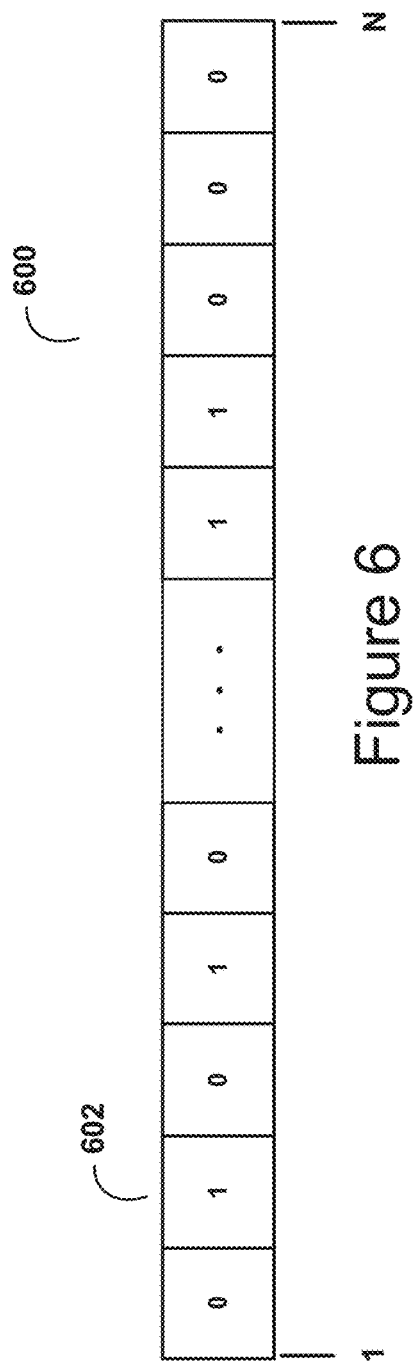
FIG. 6 is a diagram of an exemplary example of a non-limiting embodiment in accordance with some embodiments of the present disclosure.

In some embodiments, a user's persona can be stored as a vector. FIG. 6 is a diagram of an exemplary example depicting a user interest vector comprising N positions, each of which represents a specific interest, e.g., shopping, travel, finance/investment, sports, Groupon®, etc. Each one of the N positions can be set equal to a value indicating whether or not the corresponding interest has been determined for the user. For example, a value of 0 (or Y, T, etc.) can be used to indicate that the user has the corresponding interest and a value of 1 (or N, F, etc.) can be used to indicate that the user does not have the corresponding interest.

Referring again to FIG. 4, at Step 406, which is performed by contact identification module 304, a number, C, of the user's top contacts is identified. For example and in a case that C is equal to 50, the 50 top contacts of the user are determined. The determination is made using the user's digital messages and is based on a frequency of interaction determined for each contact using the data obtained at Step 402. For each contact, the interaction frequency can be one or more frequencies, such as and without limitation the frequency (or number) of occurrences of sending, receiving, opening, reading, responding to, etc. a digital message involving a contact. To illustrate using an interaction frequency determined by the user sending digital messages, the top contacts can be those contacts to whom the user sent the most digital messages. In determining the send interaction frequency, the contact identification module 304 can generate a count, for each other user, of the number of times the user has sent a digital message to the contact. Then, the user's contacts can be ranked based on each contact's corresponding send interaction frequency (or send frequency) and the top C contacts can be selected using the ranking, or ordering, based on the send frequency. By way of some further examples, a receive frequency can be determined, for a contact, to be the number of digital messages received by the user from the contact, an open, or read, frequency can be determined, for a contact, to be the number of digital messages received from the contact and opened/read by the user; and a response (or reply) frequency can be determined, for a contact, to be the number of digital messages received by the user (from the contact) and responded to by the user. It should be apparent that any frequency or combination of frequencies can be used in identifying the user's top contacts.

At Step 408, which is performed by the shared interest identification module 306, the user's persona is compared with the persona of each contact of the top contacts (identified at Step 406) in order to identify one or more interests of the user that is/are shared by some number (all or some subset) of the top contacts. Assuming for the sake of example, that position 602 of vector 600 (shown in FIG. 6) corresponds to the user's interest in soccer. Each contact's persona, which can be stored as a vector 600 can be compared to the user's vector at position 602 to determine the number of the user's top contacts that share the user's interest in soccer. The process can be performed for each of the user's identified interests in order to identify which of the user's top contacts share each one of the user's interests.

At Step 410, a relationship matrix, e.g., a social networking graph or other relationship graph or matrix, is generated (or updated). For each shared interest identified in Step 408, the relationship matrix includes an indicator of the shared interest relationship between the user and each one of the user's top contacts with the shared interest.

Figure 7:
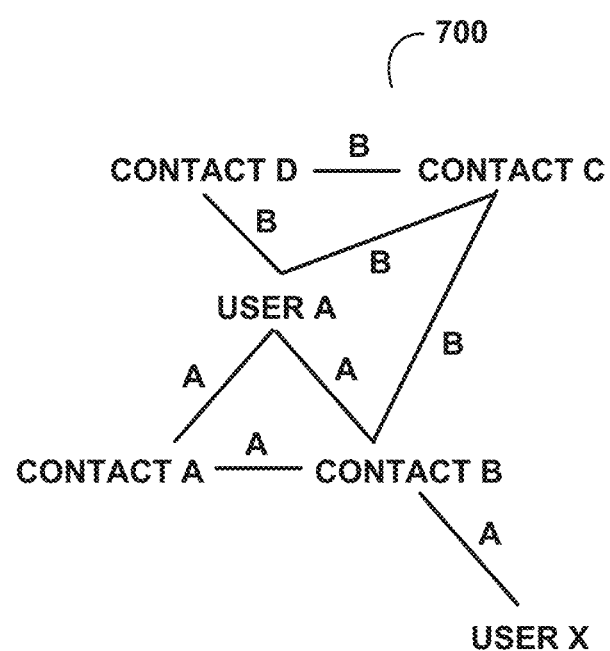
FIG. 7 is a diagram of an exemplary example of a non-limiting embodiment in accordance with some embodiments of the present disclosure.

FIG. 7 provides an example of a relationship matrix 700 including a number of shared interests identified at Step 408. While the matrix is shown as a tree-like structure, it should be apparent that any type of data structure can be used. For example, a data structure stored using a relational database can be used. User A is a user for which the process 400 is being performed to identify contacts (e.g., top contacts identified at Step 406) of User A that share at least one interest with the user. Each relationship is identified by an edge, or line, connecting User A with a contact or connecting a pair of contacts identified (using the data obtained for User A at Step 402) as having the shared interest. Each relationship further identifies the interest that is shared. In the example, User A shares Interest A with Contacts A and B and User A shares Interest B with Contact C and Contact D. In addition, the relationship matrix 700 indicates that Contact A and Contact B are related to User A and to each other by virtue of shared Interest A, and Contacts B, C and D are related to User A and to each other by virtue of shared Interest B.

Referring again to FIG. 4, at Step 412, a recommendation can be made to the user based on one or more shared interests identified at Step 408 and represented in the relationship matrix provided at Step 410. The recommendation can comprise a listing of the user's contacts and the shared interest and a recommendation on at least one action to take. By way of an example, the contacts that share an identified interest can be invited to create a group within a social networking service. For example, the group can be a discussion group. The invitation can be made in the form of a digital invitation (a digital message, such as an email) to the user and each of the identified contacts to create a messaging group, or chat group, using a messaging platform, or service, such as Yahoo! Together. The invitation can comprise a recommendation to change the mode of communication. Assume for the sake of example that the user and the contacts with the shared interest have been communicating via email, that email messages were used in identifying them and the shared interest, and that the frequency and rapidity of the email messages indicates that a messaging service (in which messages are delivered to an instant messaging client application instantaneously) would be better suited for their communication, the recommendation can include an email to the user and contacts with a recommendation to use a messaging service for their communication regarding the shared interest rather than using email to communicate.

As yet another example, assuming that the user and a number of the user's top contacts, share an interest in a sports league, the recommendation can comprise an invitation for the user and identified contacts to participate in a fantasy league in an online fantasy sports/gaming platform, or service. As yet another example, assuming that the user has an interest in traveling to New York City and a number of the user's top contacts have traveled to (or are planning to) travel to New York City, the recommendation to the user can include a listing of those contacts, so that the user can contact them to discuss aspects of the travel.

In some embodiments, the recommendation (made at Step 412) can be a recommended activity (e.g., visit a point of interest, or POI) that can be undertaken by the user with the identified contacts.

In some embodiments, process 400 can include a determination of roles that are undertaken by the user and/or one or more of the user's contacts. For example the data obtained at Step 402 can be analyzed, e.g., using a machine-trained model (trained using machine learning) such as a classifier, to determine whether the user, and/or one or more of the user's contacts, acts as an influencer/initiator or a responder. The trained model can analyze the digital messaging content to determine the tone of the messages. For example, an influencer typically initiates, determines, or decides on something, e.g., "let's go here," while a follower or responder typically agrees with a proposal made by an influencer. As yet another example, a follower may describe a location (e.g., a restaurant, point of interest, etc.), while an influencer, or initiator, might suggest going to the location. The trained model can analyze the messaging content to identify the role of the user and the contact(s) in general and/or with respect to a specific shared interest. In other words, a user/contact may be an influencer in connection with one shared interest and a responder in connection with another shared interest. As yet another example, the user/contact may be considered to be universally (across all shared interests) an influencer or a responder.

In some embodiments, a recommendation can be made (at Step 412) to an influencer (with an identified interest) so that the influencer can then influence (make a proposal to) the other users identified has sharing the interest to take some action (e.g., participate in an online fantasy sports gaming service, join a chat group, plan an event, etc.).

In some embodiments, the relationship matrix can be updated, e.g., at Step 410, to identify the user/contact has being an influencer, responder, etc. in general and/or in connection with a shared interest. In accordance with some embodiments, the recommendation made at Step 412 can consider the role of the user and the contacts. For example, in a case that the user is an influencer, the recommendation can be provided to the user; however, in the case that the user is a responder and one or more of the identified contacts is an influencer, the recommendation can be made to the influencer(s) alone or in addition to making the recommendation to the user.

In the example matrix 700, another user, User X, has an interest in Interest A, determined using process 400 using the digital messages obtained for User X. As shown in the example, User X shares the Interest A with Contact B who shares Interest A with User A. In some embodiments, the recommendation made to User A (and/or User X), at Step 412, is a recommendation to either or both of the users to add the other user as a direct relationship (e.g., a friend in Facebook®).

In some embodiments, the relationship matrix can include information identifying the groups formed between users as well as sub-groups of users, relationships between group members, past, present and future group activities. The relationship matrix can be used as a social graph that maps the relationships between the users and then used to provide recommendations to encourage users to engage in messaging platforms, different, social networking platforms, group platforms, etc.

With respect to group recommendations, in accordance with some embodiments, the relationship matrix can be used to recommend groups to join or create, to recommend activities, deals, offers, etc. to users to aid in their enjoyment and participation in a group and the activities of the group. In addition, members of a group can be jointly notified of group events, birthdays, etc. to aid them in planning future events. The leader(s) of a group can be determined, as discussed herein in connection with detection of an influencer, and the identified group leader(s) can receive recommendations, such as promotions of activities, events, etc., so that the leader(s) can encourage the followers (or responders) to join in.

By virtue of the process 400 performed by engine 300, the need for a user to perform a digital message search and/or a search of the user's address book is avoided, as the process 400 identifies those users with shared interests automatically. Thus, the process 400 make the user more efficient in using the user's digital messages and more efficient in sharing communication with other users based on the determined shared interest(s). In addition, the process 400 provides a mechanism for focusing communication(s) by the user to those other users that have at least one identified shared interest, thereby reducing unwanted network traffic. The term blast email is used to refer to a single sending of an email to many people at the same time. Without the systems and methods described herein, the email would be sent to people that are not interested in the email. Using the systems and methods described herein, a digital message can be a focused transmission to those people determined to have an interest, thereby limited unwanted and unnecessary network traffic.

In accordance with one or more embodiments, a strength of a shared interest may be determined using the data obtained at Step 402. For example, at Step 404 (which is performed by personal generation module 302), the user's digital messages are used to identify the user's interest(s). In some embodiments, for each identified interest of the user, the number of digital messages used in identifying the interest can be counted and then used to determine the strength of the user's interest. For example, assume that 50 digital messages indicated that the user was interested in travel, 30 digital messages indicated the user's interest in shopping and 30 digital messages indicated the user's interest in finance. In this scenario, the user's interest in travel can be said to be stronger than the user's interest in shopping and the user's interest in finance. The strength of a shared interest can be associated with the shared interest. The strength of a shared interest relative to other shared interests may be used in selecting a shared interest to make a recommendation at Step 412.

As shown in FIG. 8, internal architecture 800 of a computing device(s), computing system, computing platform, user devices, set-top box, smart TV and the like includes one or more processing units, processors, or processing cores, (also referred to herein as CPUs) 812, which interface with at least one computer bus 802. Also interfacing with computer bus 802 are computer-readable medium, or media, 806, network interface 814, memory 804, e.g., random access memory (RAM), run-time transient memory, read only memory (ROM), media disk drive interface 820 as an interface for a drive that can read and/or write to media including removable media such as floppy, CD-ROM, DVD, media, display interface 810 as interface for a monitor or other display device, keyboard interface 816 as interface for a keyboard, pointing device interface 818 as an interface for a mouse or other pointing device, and miscellaneous other interfaces not shown individually, such as parallel and serial port interfaces and a universal serial bus (USB) interface.

Memory 804 interfaces with computer bus 802 so as to provide information stored in memory 804 to CPU 812 during execution of software programs such as an operating system, application programs, device drivers, and software modules that comprise program code, and/or computer executable process steps, incorporating functionality described herein, e.g., one or more of process flows described herein. CPU 812 first loads computer executable process steps from storage, e.g., memory 804, computer readable storage medium/media 806, removable media drive, and/or other storage device. CPU 812 can then execute the stored process steps in order to execute the loaded computer-executable process steps. Stored data, e.g., data stored by a storage device, can be accessed by CPU 812 during the execution of computer-executable process steps.

Persistent storage, e.g., medium/media 806, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 828 typically provides information communication using transmission media through one or more networks to other devices that use or process the information. For example, network link 828 may provide a connection through local network 824 to a host computer 826 or to equipment operated by a Network or Internet Service Provider (ISP) 830. ISP equipment in turn provides data communication services through the public, worldwide packet-switching communication network of networks now commonly referred to as the Internet 832.

A computer called a server host 834 connected to the Internet 832 hosts a process that provides a service in response to information received over the Internet 832. For example, server host 834 hosts a process that provides information representing video data for presentation at display 810. It is contemplated that the components of system 800 can be deployed in various configurations within other computer systems, e.g., host and server.

At least some embodiments of the present disclosure are related to the use of computer system 800 for implementing some or all of the techniques described herein. According to one embodiment, those techniques are performed by computer system 800 in response to processing unit 812 executing one or more sequences of one or more processor instructions contained in memory 804. Such instructions, also called computer instructions, software and program code, may be read into memory 804 from another computer-readable medium 806 such as storage device or network link. Execution of the sequences of instructions contained in memory 804 causes processing unit 812 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 800. Computer system 800 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 802 as it is received, or it may be stored in memory 804 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

The invention claimed is:

1. A method comprising:
obtaining, at a computing device, a plurality of digital messages of a user, the digital messages indicating digital messaging contacts of the user;
using, via the computing device, the plurality of digital messages of the user to:
determine a persona of the user, the user's persona identifying a number of interests of the user identified using the plurality of digital messages; and
determine a plurality of contacts of the user, for each contact of the plurality of contacts, the determining comprising determining, for each contact, an interaction frequency with the user using the plurality of digital messages;
selecting, via the computing device and using the interaction frequency with the user determined for each of the plurality of contacts, a number of contacts from the plurality of contacts, each selected contact, of the number of contacts, having a higher interaction frequency with the user than unselected contacts of the plurality of contacts;
determining, via the computing device, an interest shared by the user and at least one selected contact of the number of contacts, the determining comprising comparing the persona of the user with the persona of each selected contact of the number of contacts, the shared interest being identified in the persona of the user and the at least one selected contact;
automatically maintaining, via the computing device, a relationship data structure to include information indicating a relationship between the user and the at least one selected contact, the relationship identifying the shared interest between the user and the at least one selected contact determined using each respective persona; and
automatically making, via the computing device and using the identified shared interest and relationship information from the relationship data structure, a recommendation directed to at least one of the user and the at least one contact, the recommendation identifying the shared interest and recommending at least one online group activity for the user and the at least one contact to share in accordance with the shared interest, the online group activity recommendation comprising a recommendation to form a group specific to the shared interest.

2. The method of claim 1, further comprising:
generating, via the computing device, a machine-trained model using a training data set; and
determining the persona further comprising using the machine-trained model and information extracted from the plurality of digital messages in identifying the number of interests of the user.

3. The method of claim 2, the machine-trained model is a classifier trained using supervised training and the training data set comprises a supervised training data set.

4. The method of claim 1, the digital messages comprise different types of digital messages.

5. The method of claim 1, the digital messages comprise a same type of digital message.

6. The method of claim 1, determining an interaction frequency, for a contact of the plurality of contacts, using the plurality of digital messages further comprising determining at least one of:
  determining a number of digital messages, of the plurality of digital messages, sent by the user that indicated the contact;
  determining a number of digital messages, of the plurality of digital messages, received by the user that indicated the contact;
  determining a number of digital messages, of the plurality of digital messages, received and opened by the user that indicated the contact; and
  determining a number of digital messages, of the plurality of digital messages, received and responded to by the user that indicated the contact.

7. The method of claim 1, the group is a chat group.

8. The method of claim 1, the group is a social networking group.

9. The method of claim 1, the group is a chat group and the recommendation comprises an invitation to create the group, on a chat platform, to communicate about the shared interest.

10. A non-transitory computer-readable storage medium tangibly encoded with computer-executable instructions that when executed by a processor associated with a computing device perform a method comprising:
  obtaining a plurality of digital messages of a user, the digital messages indicating digital messaging contacts of the user;
  using the plurality of digital messages of the user to:
    determine a persona of the user, the user's persona identifying a number of interests of the user identified using the plurality of digital messages; and
    determine a plurality of contacts of the user, for each contact of the plurality of contacts, the determining comprising determining, for each contact, an interaction frequency with the user using the plurality of digital messages;
  selecting, using the interaction frequency with the user determined for each of the plurality of contacts, a number of contacts from the plurality of contacts, each selected contact, of the number of contacts, having a higher interaction frequency with the user than unselected contacts of the plurality of contacts;
  determining an interest shared by the user and at least one selected contact of the number of contacts, the determining comprising comparing the persona of the user with the persona of each selected contact of the number of contacts, the shared interest being identified in the persona of the user and the at least one selected contact;
  automatically maintaining a relationship data structure to include information indicating a relationship between the user and the at least one selected contact, the relationship identifying the shared interest between the user and the at least one selected contact determined using each respective persona; and
  automatically making, using the identified shared interest and relationship information from the relationship data structure, a recommendation directed to at least one of the user and the at least one contact, the recommendation identifying the shared interest and recommending at least one online group activity for the user and the at least one contact to share in accordance with the shared interest, the online group activity recommendation comprising a recommendation to form a group specific to the shared interest.

11. The non-transitory computer-readable storage medium of claim 10, further comprising:
  generating a machine-trained model using a training data set; and
  determining the persona further comprising using the machine-trained model and information extracted from the plurality of digital messages in identifying the number of interests of the user.

12. The non-transitory computer-readable storage medium of claim 11, the machine-trained model is a classifier trained using supervised training and the training data set comprises a supervised training data set.

13. The non-transitory computer-readable storage medium of claim 10, the digital messages comprise different types of digital messages.

14. The non-transitory computer-readable storage medium of claim 10, the digital messages comprise a same type of digital message.

15. The non-transitory computer-readable storage medium of claim 10, determining an interaction frequency, for a contact of the plurality of contacts, using the plurality of digital messages further comprising determining at least one of:
  determining a number of digital messages, of the plurality of digital messages, sent by the user that indicated the contact;
  determining a number of digital messages, of the plurality of digital messages, received by the user that indicated the contact;
  determining a number of digital messages, of the plurality of digital messages, received and opened by the user that indicated the contact; and
  determining a number of digital messages, of the plurality of digital messages, received and responded to by the user that indicated the contact.

16. The non-transitory computer-readable storage medium of claim 10, the group is a social networking group.

17. The non-transitory computer-readable storage medium of claim 10, the group is a chat group and the recommendation comprises an invitation to create the group, on a chat platform, to communicate about the shared interest.

18. A computing device comprising:
  a processor;
  a non-transitory storage medium for tangibly storing thereon program logic for execution by the processor, the program logic comprising:
  obtaining logic executed by the processor for obtaining a plurality of digital messages of a user, the digital messages indicating digital messaging contacts of the user;
  using logic executed by the processor for using the plurality of digital messages of the user, the using logic comprising:
    determining logic executed by the processor for determining a persona of the user, the user's persona identifying a number of interests of the user identified using the plurality of digital messages; and
    determining logic executed by the processor for determining a plurality of contacts of the user, for each contact of the plurality of contacts, the determining comprising determining, for each contact, an interaction frequency with the user using the plurality of digital messages;

selected logic executed by the processor for selecting, using the interaction frequency with the user determined for each of the plurality of contacts, a number of contacts from the plurality of contacts, each selected contact, of the number of contacts, having a higher interaction frequency with the user than unselected contacts of the plurality of contacts;

determining logic executed by the processor for determining an interest shared by the user and at least one selected contact of the number of contacts, the determining comprising comparing the persona of the user with the persona of each selected contact of the number of contacts, the shared contact being identified in the persona of the user and the at least one selected contact;

maintaining logic executed by the processor for automatically maintaining a relationship data structure to include information indicating a relationship between the user and the at least one selected contact, the relationship identifying the shared interest between the user and the at least one selected contact determined using each respective persona; and making logic executed by the processor for automatically making, using the shared interest and relationship information from the relationship data structure, a recommendation directed to at least one of the user and the at least one contact, the recommendation identifying the shared interest and recommending at least one online group activity for the user and the at least one contact to share in accordance with the shared interest, the online group activity recommendation comprising a recommendation to form a group specific to the shared interest identified using the relationship data structure.

* * * * *